(12) United States Patent
Osmecki

(10) Patent No.: US 6,648,356 B2
(45) Date of Patent: Nov. 18, 2003

(54) SUSPENSION METHOD AND DEVICE FOR A BICYCLE FRAME, BICYCLE FRAME PROVIDED WITH SUCH A SUSPENSION DEVICE AND BICYCLE EQUIPPED WITH SUCH A FRAME

(75) Inventor: Jacek J. Osmecki, Hudson, MA (US)

(73) Assignee: Barry Wright Corporation, Brighton, MA (US)

( * ) Notice: Subject to any disclaimer, the term of this patent is extended or adjusted under 35 U.S.C. 154(b) by 0 days.

(21) Appl. No.: 09/929,004

(22) Filed: Aug. 15, 2001

(65) Prior Publication Data
US 2003/0034629 A1 Feb. 20, 2003

(51) Int. Cl.⁷ ................................................. B62K 3/00
(52) U.S. Cl. ....................... 280/284; 267/281
(58) Field of Search ................... 267/279, 281, 267/282, 293, 294; 280/283, 284, 285, 288

(56) References Cited

U.S. PATENT DOCUMENTS

| 2,532,574 | A | * | 12/1950 | Schwinn | |
|---|---|---|---|---|---|
| 3,151,878 | A | * | 10/1964 | Uncles | |
| 5,217,241 | A | * | 6/1993 | Girvin | 280/284 |
| 5,997,022 | A | * | 12/1999 | Matsui | 280/284 |
| 6,209,858 | B1 | * | 4/2001 | Fujii | 267/201 |
| 6,276,706 | B1 | * | 8/2001 | Yih | 280/284 |
| 6,386,567 | B1 | * | 5/2002 | Schonfeld | 280/283 |

* cited by examiner

Primary Examiner—Avraham Lerner
(74) Attorney, Agent, or Firm—Clark & Brody

(57) ABSTRACT

A suspension method for stabilizing a bicycle frame is provided with an elastically deformable damping suspension in order to absorb shocks, wherein said method consists of elastically deforming a suspension device by a torsional effect perpendicularly to the bicycle frame. The suspension device extends over a frame plane and is fitted out to implement the method by providing a damping torsional device arranged about at least one axis contained in a torsional plane perpendicular to the frame plane.

13 Claims, 5 Drawing Sheets

US 6,648,356 B2

SUSPENSION METHOD AND DEVICE FOR A BICYCLE FRAME, BICYCLE FRAME PROVIDED WITH SUCH A SUSPENSION DEVICE AND BICYCLE EQUIPPED WITH SUCH A FRAME

FIELD OF THE INVENTION

The invention relates to a suspension method for a bicycle frame, a suspension device for implementing such, a bicycle frame provided with said suspension device, especially for a rear wheel fork of said frame, and a bicycle equipped with such a frame.

PRIOR ART

The bicycles of the prior art, and especially the mountain bikes, are commonly provided with front wheel and/or rear wheel suspension devices in order to absorb shocks and vibrations for damping the bike during a ride. These devices comprise generally at least one spring (two for the front fork), usually coupled with a hydraulic piston. The hydraulic piston works with the spring in such a way that the wheels can move vertically within a range of motion of about 5 to 15 centimeters when climbing on a rock or passing above a pothole. Such suspension devices are placed either on the front fork and/or between the central rigid frame and a rear fork that supports the rear wheel.

These suspension devices are however heavy and complex to manufacture because of the numerous pieces. Furthermore, they are not easily mountable or dismountable, e.g. to fix or replace them, because of the tight combination of the pieces. Moreover, their efficiency is not sufficient in hard or extreme conditions (e.g. very rough ground, sports competition or high jump) because of the low range of vertical motion of the bike wheels equipped with such a suspension device.

OBJECTS OF THE INVENTION

It is an object of the present invention to provide a solution to at least one of the aforementioned problems.

SUMMARY OF THE INVENTION

For that purpose, the object of the invention is to provide a bicycle frame with an elastically deformable damping suspension for stabilizing purposes, that is more practical than springs and pistons usually used.

The invention relates more specifically to a suspension method for stabilizing a bicycle frame in order to absorb shocks, wherein said method consists of elastically deforming said suspension by a torsional effect perpendicularly to the bicycle frame.

The invention also relates to a suspension device to stabilize a bicycle frame extending over a frame plane and fitted out to implement such a method, and comprising damping torsional means about at least one axis contained in a torsional plane perpendicular to the frame plane.

In a preferred embodiment, such axis is perpendicular to the frame plane.

The invention also relates to a bicycle frame comprising:
a tubular rigid structure which extends substantially over a frame plane,
at least one wheel fork made up two tubular arms symmetrically arranged in view of the frame plane and defining a medium longitudinal direction in the frame plane,
at least one suspension device linking the wheel fork to the tubular rigid structure to absorb shocks,
wherein said suspension device comprises a damping means which is torsionally deformable about an axis, said axis being at an angle substantially ranged between 30 and 90 degrees regarding said medium direction, and preferably at right angles.

Preferably, said bicycle frame further comprises different means for connecting said damping means to the rear fork on one hand, and to the tubular rigid structure on the other hand.

Advantageously, one suspension device comprises a first rigid plate fixedly secured to the fork facing a second rigid plate fixedly secured to the rigid structure, and said damping means is a damping pad fixedly secured between and to the first and second rigid plates.

According to a preferred embodiment of the present invention, each of the two tubular arms of the wheel fork is linked to the tubular rigid structure by a suspension device comprising:
an external rigid plate fixedly secured respectively to internal parts of the arms of the fork,
an internal rigid plate fixedly secured to opposite sides of a tube of the tubular rigid structure,
each internal rigid plate facing an external rigid plate and a damping pad being respectively fixedly secured and arranged between a pair of internal and external rigid plates.

Preferably, the two suspension devices of a wheel fork are coaxial with a common axis perpendicular to the frame plane.

Each damping pad is preferably made of rubber and is permanently bonded to the internal and external rigid plates by means of vulcanization. Therefore, the damping means forms an integral unity with the plates.

According to preferred embodiments, each internal rigid plate is provided with two anti-rotational studs for its securing to the tubular rigid structure, and each external plate is provided with two holes for its securing to a tube of the rear fork.

Preferably, each damping means has a circular shape.

The invention also relates to a bicycle provided especially with said frame, the rigid structure of which having a crank gear, and two wheel forks, a front and a rear one to fit respectively a front and a rear wheel. In preferred embodiments, the wheel fork suspended is the rear wheel fork and said suspension device is arranged just above the crank gear and coaxial with said crank gear.

DETAILED DESCRIPTION OF THE PREFERRED EMBODIMENT

Figure 1:
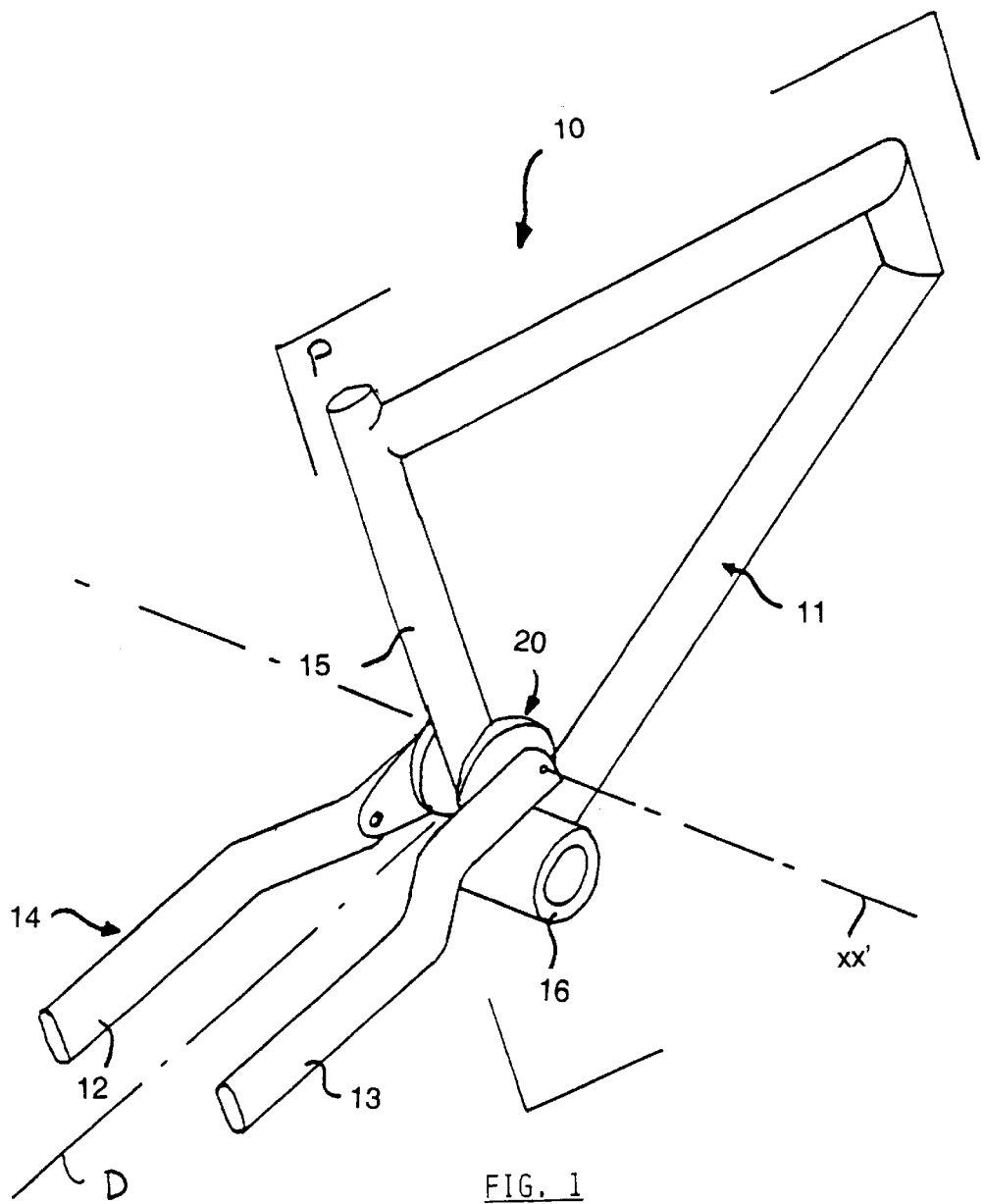
FIG. 1 is a schematic perspective view of a bicycle frame provided with a suspension device according to the present invention.
Figure 2:
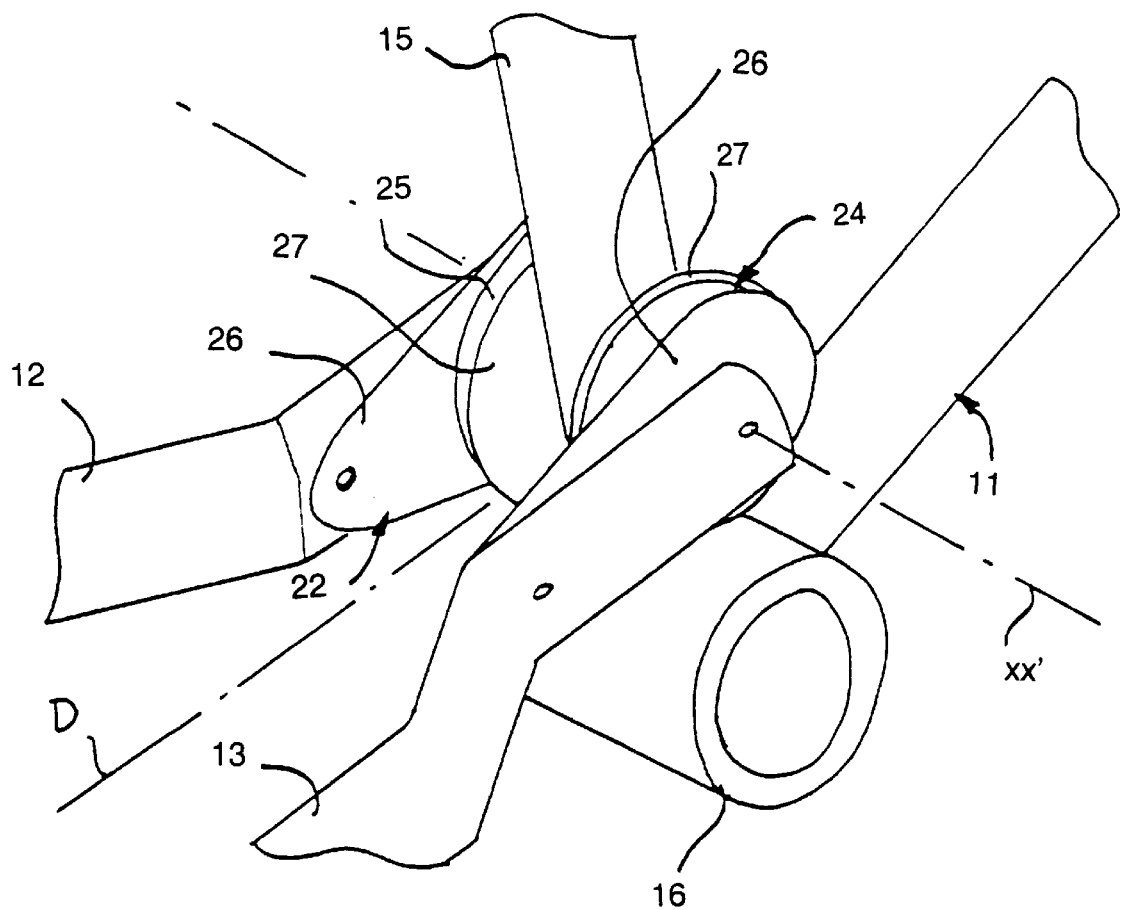
FIG. 2 is a detailed view of FIG. 1.

FIGS. 1 and 2 describe a bicycle frame 10 according to the present invention. This frame 10 comprises several hollow tubes made of metal like stainless steel or aluminum alloy, or even carbon fiber. These tubes are linked together, for example by a welding technique, so as to form a substantially triangular-shaped tubular rigid structure 11 which extends substantially over a frame plane P.

Two tubular arms 12 and 13 are connected to a substantially vertical tube 15 of the rigid structure 11, just above a crank gear 16, to form a suspended rear fork 14. The tubes 12 and 13 are symmetrically arranged in view of the frame plane and define a medium longitudinal direction D in said frame plane. The tubes 12 and 13 are articulated according to the rigid structure 11 and pivot about an axis xx' perpendicular to the frame plane P.

A rear suspension device 20 links each arm 12 and 13 of the rear wheel fork 14 to the vertical tube 15 of the frame 10 so as to absorb shocks and vibrations in order to damp the bike when riding.

As it can be seen on FIG. 2, the suspension device 20 comprises two parts 22 and 24 symmetrically arranged on two opposite sides of the vertical tube 15.

Each part 22 or 24 of the suspension device 20 comprises a damping pad 25, arranged between an external rigid plate 26 and an internal rigid plate 27. The plates, which are made of an aluminum alloy, are arranged parallel to each other and to the frame plane, as shown in FIGS. 3 to 6.

Each damping pad 25 is a rubber disc thicker than the rigid plates and fixedly secured to said plates by permanent bonding, for example during a vulcanization molding process not described here.

The two external rigid plates 26 are respectively fixedly secured to the tubes 12 and 13 of the rear fork 14.

Figure 3:
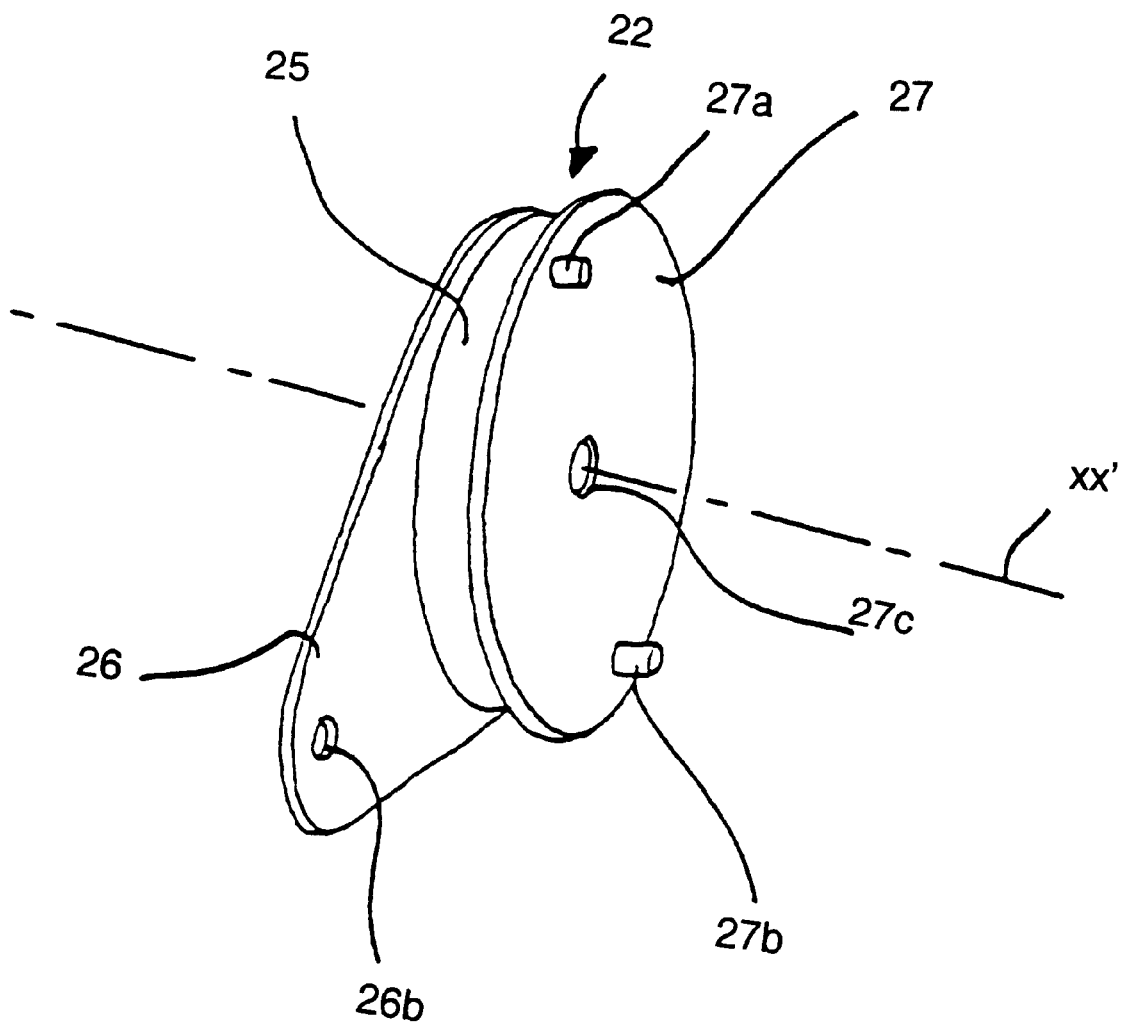
FIG. 3 is a partial perspective view of the suspension device of FIG. 2.
Figure 4:
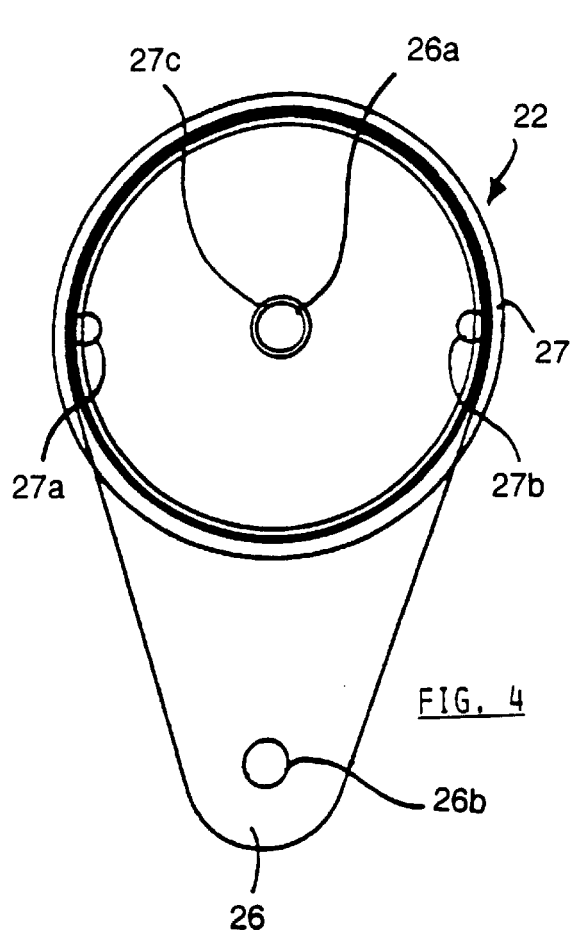
FIG. 4 is a front view of FIG. 3.
Figure 5:
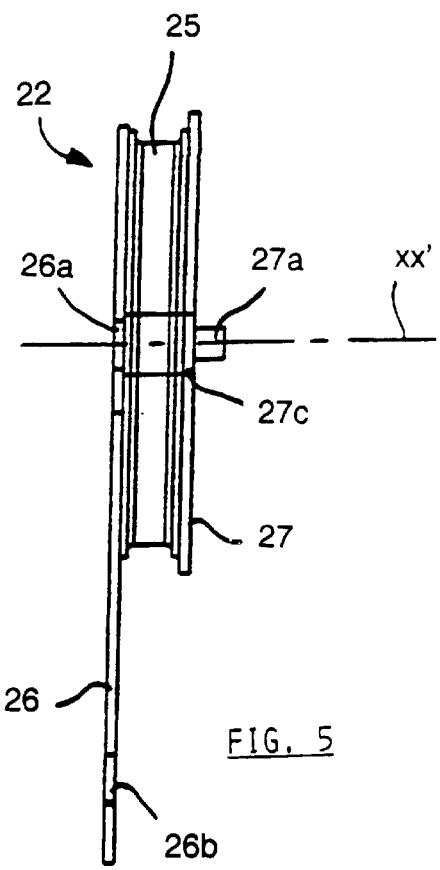
FIG. 5 is a side view of FIG. 3.

For this purpose, each external rigid plate 26 has substantially the shape of a drop and is provided with a first central hole 26a coaxial with the axis xx' and a second hole 26b arranged near the narrow part of the drop (see FIGS. 3 and 4). These holes are adapted to receive a screw or a bolt (not shown) for fixing the external rigid plate 26 to the corresponding arm 12 or 13 of the rear wheel fork so as to avoid any rotation of the external rigid plate 26.

Figure 6:
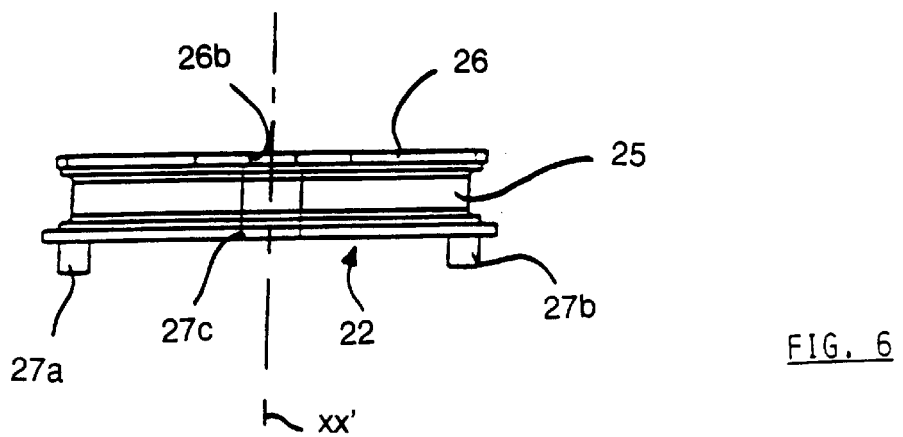
FIG. 6 is another side view of FIG. 3.

Each internal rigid plate 27 has the shape of a thin disc and is provided with two prominent studs 27a and 27b arranged symmetrically in view of the axis xx' (see FIGS. 3 and 6). The anti-rotational studs 27a and 27b penetrate inside two holes (not shown) of the vertical tube 15 so that, when the rear fork 14 swivels about the axis xx', the rigid plate 27 can not turn. The internal plate 27 is also provided with a central hole 27c, for example for a fixing bolt.

When a bicycle equipped with the suspension device 20 is ridden by a rider, for example in woods or on uneven ground, said suspension device 20 absorbs the shocks and vibrations that the rear wheel and the rider (his legs, bottom and arms) would absorb without said suspension device. Thus, the device helps the rider to stabilize the bike so that he can ride it more efficiently.

In operation, the two damping pads 25 are deformed by torsional forces exerted between the external plates 26 and the internal plates 27, as well as between the static rigid structure 11, especially the vertical tube 15, and the rear fork 14. The rubber of the disc pad 15 is strongly fixed to the plates 26 and 27 and is tough enough to bear the high torsion forces.

Such torsional suspension device can provide a range of motion as much as 30 centimeters of vertical travel of the rear wheel, which is very interesting for example for a professional mountain bike racer. This arrangement also produces a system which is relatively soft in the vertical direction and provides high stiffness in the lateral direction to counteract side loading during turning.

In the foregoing description, a specific example has been used to describe the invention. It is understood by those skilled in the art that modifications or adaptations can be made to this example without departing from the spirit and scope of the invention.

For instance, the sizes (shape, thickness) of the plates or/and damping pads may vary.

In other respects, the material used for the plates may vary, i.e. they may be made of carbon fiber or titanium for a better strength and lightness.

Furthermore, the device may be place closer or further to the crank gear according to the shape of the rear fork and the main tubular rigid structure. It may even be placed just under the bicycle seat.

Figure 7:
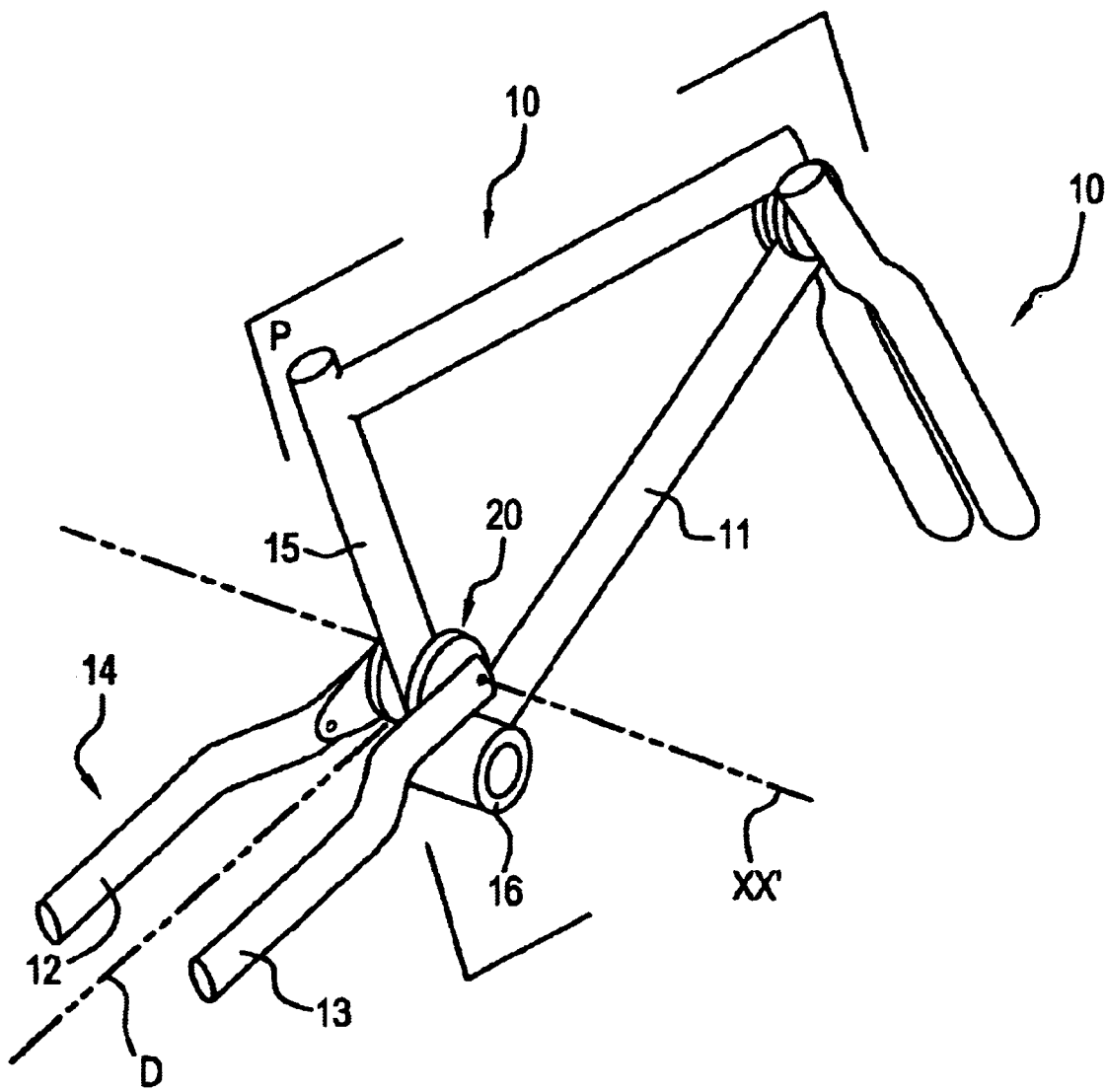
FIG. 7 is a view similar to FIG. 1 but with two wheel forks.

Moreover, the plates may be irreversibly fixed to the vertical tube and/or rear fork, for example by welding or riveting, and the damping means may also takes place in a front fork, see reference numeral 40 in FIG. 7, or a handlebar. One failsafe stop can also be provided to arrest excessive vertical travel of the wheel in each direction.

The ends of the arms of the wheel fork, which bear the damping means, may be inclined in view of the medium longitudinal direction. Thus, each damping means is torsionaly deformable about an axis that is not perpendicular to the frame plane but for example in a range of substantially 30 to 90 degrees regarding the medium direction.

As such, an invention has been disclosed in terms of preferred embodiments thereof which fulfills each and every one of the objects of the present invention as set forth above and provides a new and improved suspension method for a bicycle frame, a suspension device for implementing such, a bicycle frame provided with said suspension device, especially for a rear wheel fork of said frame, and a bicycle equipped with such a frame.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A bicycle frame comprising:
    a tubular rigid structure which extends substantially over a frame plane,
    at least one wheel fork being made up two tubular arms symmetrically arranged in view of the frame plane and defining a medium longitudinal direction in the frame plane, and
    at least one suspension device linking the wheel fork to the tubular rigid structure to absorb shocks and comprising a first rigid plate fixedly secured to the fork facing a second rigid plate fixedly secured to the rigid structure,
        wherein said suspension device further comprises a means for damping which is a damping pad fixedly secured to the first and second rigid plates, between said plates, the damping pad being torsionally deformable about an axis, said axis being at an angle substantially ranging between 30 and 90 degrees with respect to the medium longitudinal direction.

2. A bicycle frame of claim 1, wherein said suspension device further comprises first means for connecting said damping means to said rear fork on one hand, and second means for connecting said damping means to said tubular rigid structure, said first and second means being different from each other.

3. A bicycle frame of claim 1, wherein the damping means has a circular shape.

4. A bicycle frame of claim 1, wherein said suspension device is arranged just above a crank gear of said rigid structure.

5. The bicycle frame of claim 1, wherein the angle is a right angle.

6. A bicycle frame comprising:
   a tubular rigid structure which extends substantially over a frame plane;
   at least one wheel fork being made up two tubular arms symmetrically arranged in view of the frame plane and defining a medium longitudinal direction in the frame plane, and
   at least one suspension device linking the wheel fork to the tubular rigid structure to absorb shocks;
      wherein said suspension device comprises a means for damping which is torsionally deformable about an axis, said axis being at an angle substantially ranging between 30 and 90 degrees with respect to the medium longitudinal direction wherein the suspension device further comprises:
         an external rigid plate fixedly secured respectively to internal parts of the arms of the fork,
         an internal rigid plate fixedly secured to opposite sides of a tube of the tubular rigid structure,
         each internal rigid plate facing an external rigid plate and a damping pad being respectively fixedly secured and arranged between a pair of internal and external rigid plates.

7. A bicycle frame of claim 6, wherein the two suspension devices of a wheel fork are coaxial with a common axis perpendicular to the frame plane.

8. A bicycle frame of claim 6, wherein each damping pad is made of rubber and is permanently bonded to the internal and external rigid plates by means of vulcanization.

9. A bicycle frame of claim 6, wherein each internal rigid plate is provided with two anti-rotational studs for securing each internal plate to the tubular rigid structure.

10. A bicycle frame of claim 9, wherein each external plate is provided with two holes for securing each external plate to a respective tube of the rear fork.

11. A bicycle provided with a frame comprising:
    a tubular rigid structure which extends substantially over a frame plane, the rigid structure of which having a crank gear,
    two wheel forks, a front and a rear one to fit respectively a front and a rear wheel, at least one wheel fork being made up two tubular arms symmetrically arranged in view of the frame plane and defining a medium longitudinal direction in the frame plane, and
    at least one suspension device linking the wheel fork to the tubular rigid structure to absorb shocks and comprising a first rigid plate fixedly secured to the fork facing a second rigid plate fixedly secured to the rigid structure,
       wherein said suspension device further comprises a means for damping which is a damping pad fixedly secured to the first and second rigid plates, between said plates, the damping pad being torsionally deformable about an axis, said axis being at an angle substantially ranging between 30 and 90 degrees with respect to the medium longitudinal direction.

12. A bicycle of claim 11, wherein the suspended wheel fork is the rear wheel fork and said suspension device is arranged just above the crank gear.

13. The bicycle of claim 11, wherein the angle is a right angle.

* * * * *